United States Patent [19]

Thorogood et al.

[11] Patent Number: 4,869,883

[45] Date of Patent: Sep. 26, 1989

[54] INERT GAS PURIFIER FOR BULK NITROGEN WITHOUT THE USE OF HYDROGEN OR OTHER REDUCING GASES

[75] Inventors: Robert M. Thorogood, Macungie; William T. Kleinberg, Breinigsville, both of Pa.

[73] Assignee: Air Products and Chemicals, Inc., Allentown, Pa.

[21] Appl. No.: 211,484

[22] Filed: Jun. 24, 1988

[51] Int. Cl.$^4$ ................................. C01B 13/00
[52] U.S. Cl. ........................... 423/219; 423/230; 423/247; 423/262
[58] Field of Search ............... 423/262, 219, 247, 230

[56] References Cited

U.S. PATENT DOCUMENTS

| | | | |
|---|---|---|---|
| 3,061,403 | 10/1963 | Rendos | 23/2 |
| 3,535,074 | 10/1970 | Nakashima | 23/2 |
| 3,682,585 | 8/1972 | Midland et al. | 423/219 |
| 4,459,270 | 7/1984 | Leppard et al. | 423/248 |
| 4,579,723 | 4/1986 | Weltmer et al. | 423/219 |
| 4,713,224 | 12/1987 | Tamhankar et al. | 423/219 |

FOREIGN PATENT DOCUMENTS 166023 3/1953 Australia .
123711 of 1970 Japan .

*Primary Examiner*—Gregory A. Heller
*Attorney, Agent, or Firm*—Willard Jones, II; James C. Simmons; William F. Marsh

[57] ABSTRACT

The present invention relates to a three stage process using copper, copper oxide and molecular sieve adsorbent beds for the sequential removal of oxygen, hydrogen, carbon monoxide, carbon dioxide and water from an inert feed gas. The process is especially suited to the purification of nitrogen gas from an air separation plant, which can be purified from a contaminant level of 30 vppm oxygen+carbon monoxide+hydrogen to less than 10 vppb each of oxygen, carbon monoxide, hydrogen, carbon dioxide and water, without the addition of hydrogen or another reducing gas to the process.

4 Claims, 1 Drawing Sheet

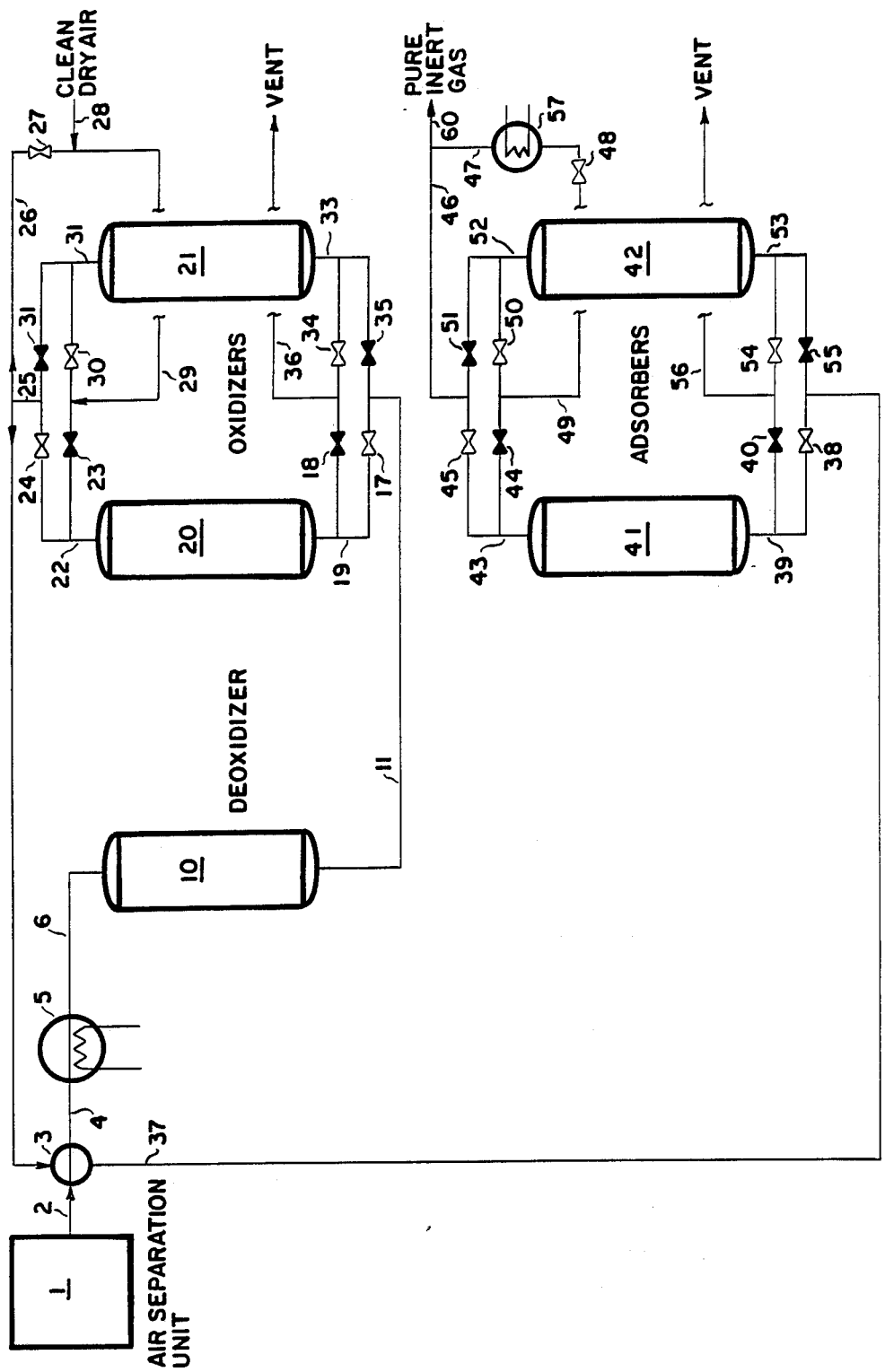

INERT GAS PURIFIER FOR BULK NITROGEN WITHOUT THE USE OF HYDROGEN OR OTHER REDUCING GASES

TECHNICAL FIELD

The present invention relates to a process for the purification of nitrogen produced from an air separation unit to remove hydrogen, carbon monoxide, oxygen, carbon dioxide and water.

BACKGROUND OF THE INVENTION

A number of techniques are known for the removal of impurities (either singular impurities or combined impurities) from inert gas, among these are the following.

A first method utilizes metal "getters", typically composed of mixtures of zirconium, aluminum, iron and vanadium, to remove impurities from an inert gas by reaction or chemisorption. A major disadvantage of this method is the necessity for operation at high temperature (400° C.) with even higher temperatures for initial activation (500°-700° C.). Additionally, these materials have a limited capacity and can only be regenerated and reused a small number of times before their effectiveness is lost.

A second method utilizes a platinum group catalyst (e.g., platinum and palladium) to remove oxygen from an inert gas by reaction with added hydrogen at temperatures from ambient to 300° C.; this second method is described in U.S. Pat. No. 3,535,074. In this particular description, a second absorber bed utilizing copper or nickel is used to remove any transient high concentrations of oxygen. The added hydrogen is removed by distillation of the product.

A third method utilizes reduced copper or nickel containing beds at temperatures from ambient to 250° C. for removal of oxygen. These beds are regenerated from the oxidized state by reduction with a stream containing hydrogen.

Two methods have been described in the art for the removal of combined impurities of oxygen, hydrogen, carbon monoxide, carbon dioxide and hydrogen.

The first of these two methods is described in U.S. Pat. No. 4,579,723, wherein a commercial catalyst material (e.g., Engelhard Deoxo A containing Cr and Pt) is used to react carbon monoxide and hydrogen with oxygen at ambient temperature forming carbon dioxide and water. Residual oxygen and carbon dioxide are removed in a second bed containing a gettering material (e.g., Dow Q1) which is effective to remove oxygen and carbon dioxide. Water is removed by adsorption in one or both beds. It is necessary to regenerate the beds with a hydrogen containing stream at about 200° C. to maintain their effectiveness.

In the second of these methods a nickel containing bed is used to simultaneously remove oxygen, carbon monoxide, hydrogen, water and carbon dioxide from an inert gas at ambient temperature; this method is disclosed in U.S. Pat. No. 4,713,224. The nickel containing bed is subsequently regenerated with a hydrogen containing stream.

In all of these above processes, it is necessary that the hydrogen be added to the process either for the primary removal of the impurity or for regeneration. This addition of hydrogen adds the cost of the hydrogen supply and the provision of equipment to ensure the safe handling of hydrogen.

Other processes known in the art are disclosed in U.S. Pat. Nos. 3,061,403; 3,682,585 and 4,459,270 and Australian Pat. No. 16826/53.

SUMMARY OF THE INVENTION

The present invention is a process for the purification of a bulk inert gas stream, wherein the bulk inert gas stream contains oxygen, carbon monoxide and hydrogen impurities and wherein the molar concentration of the carbon monoxide plus hydrogen impurities on a time-averaged basis exceeds two times the molar concentration of the oxygen impurity. The process comprises three sequential steps: (a) the oxygen present in the bulk inert gas stream is reacted with the carbon monoxide and hydrogen present in the bulk inert gas stream in the presence of a reduced copper containing catalyst at a temperature from 150° to 250° C. to form carbon dioxide and water; (b) unreacted carbon monoxide and hydrogen from step (a) are reacted with the oxygen component of a copper oxide containing catalyst at a temperature from 150° to 250° C. to from carbon dioxide, water and reduced copper; and (c) water and carbon dioxide are removed by adsorption on an adsorption, preferably a molecular sieve adsorbent.

The reduced copper formed during step (b) is intermittently reoxidized to copper oxide with an oxygen containing stream at a temperature in the range between about 50° and about 150° C. The adsorbent of step (c) is regenerated at intervals with a portion of the purified bulk inert gas stream at temperatures of about 150° to about 250° C.

BRIEF DESCRIPTION OF THE DRAWING

The single FIGURE of the drawing is a schematic diagram of the process of the present invention.

DETAILED DESCRIPTION OF THE INVENTION

The manufacture of semiconductors in the electronics industry comprises many process steps in which the materials are exposed to inert process gases (especially nitrogen). Impurities contained in the inert gases react with the semiconductor surface to generate undesirable properties. This is a particular problem in the production of advanced semiconductor devices with very small feature sizes, higher device density and larger chip sizes. It is therefore necessary to produce inert gases with minimal impurity levels (preferably below 10 vppb).

For the case of nitrogen, large quantities of gas are required; many installations use up to 100,000 SCFH. Because of these large quantities, the preferred manner of production of such bulk gas is by cryogenic air separation, which results in a product which contains oxygen, hydrogen and carbon monoxide impurities at parts per million concentrations where the sum of the hydrogen and carbon monoxide impurities significantly exceeds the oxygen; thus creating the problem to efficiently and safely remove these impurities.

The present invention is an improved process for the purification of bulk quality inert gas (nitrogen) from impurity levels of up to 30 vppm of carbon monoxide+hydrogen+oxygen in which the carbon monoxide+hydrogen content exceeds two times the oxygen content. The resultant product of the process of the present invention contains less than 0.1 vppm of each of the impurities oxygen, carbon monoxide, hydrogen, carbon dioxide and water.

The process comprises three sequential purification stages. The first stage utilizes a reduced copper containing catalyst at a temperature from 150° to 250° C. to react oxygen with carbon monoxide and/or hydrogen to carbon dioxide and/or water. The copper catalyst is maintained in a continuously reduced state by the excess of reducing gas impurities (i.e., carbon monoxide and hydrogen) in the inert gas. The second stage is a copper oxide containing bed also operated at 150° to 250° C. in which the residual hydrogen and carbon monoxide are converted to water and carbon dioxide by reaction with the oxygen component of the copper oxide catalyst thereby producing reduced copper. This bed is reoxidized at intervals using an oxygen containing stream at 50° to 150° C. The third stage is an adsorbent bed preferably containing a molecular sieve for the adsorption of water and carbon dioxide. The adsorber bed is operated at ambient conditions. This molecular sieve bed is regenerated at intervals with a portion of the product nitrogen stream at temperatures of 150° to 250° C.

The operation of the process is best described with reference to the single figure of the drawing. With reference to the single figure, inert gas (nitrogen) in bulk gas quality is produced from an air separation unit 1 and removed via line 2 at a pressure from 15 to 250 psia, typically 130 psia. The bulk inert gas in line 2 typically contains from about 0.2 to 2 vppm, oxygen; about 0.2 to 2 vppm, carbon monoxide and about 0.2 to 2 vppm, hydrogen, in addition to other trace inert gases such as argon, helium and neon. The bulk nitrogen is fed at near to ambient temperature via line 2 to heat exchanger 3, wherein it is warmed to approximately 150° C. and then via line 4 to heater 5 wherein it is heated to approximately 175° C. The warmed inert gas then is fed via line 6 to deoxidizer vessel 10. Deoxidizer vessel 10 contains a reduced copper catalyst, which causes the oxygen to react with the hydrogen and/or carbon monoxide to form water and carbon dioxide. During temporary periods of operation when insufficient hydrogen or carbon monoxide are present to fully react with the oxygen, the residual oxygen will be removed by reaction with the reduced copper catalyst to form copper oxide. The molar recess of hydrogen and carbon monoxide to oxygen on average in the bulk inert gas ensures that reduction of any copper oxide formed to copper occurs on a continual basis. Thus, there is no requirement for regeneration of this bed.

The gas, from deoxidizer 10, now containing hydrogen, carbon monoxide, carbon dioxide and water impurities is fed via line 11 through isolation valve 17 and line 19 to oxidizer vessel 20. Oxidizer vessel 20 is one of a pair of oxidizer vessels (with vessel 21) which are operated sequentially on a cycle of several days. Oxidizer vessel 20 (or alternatively 21) contains a copper oxide catalyst (e.g., BASF catalyst R3-11) which totally oxidizes any residual hydrogen and carbon monoxide impurities to water and carbon dioxide.

The hot gas from oxidizer 20, which is lean in oxygen, carbon monoxide and hydrogen, is removed via line 22 through isolation valve 24 and then line 25 to heat exchanger 3 where it is cooled to close to ambient temperature against the bulk nitrogen feed gas to the purifier process. The cooled gas containing water and carbon dioxide impurities is then fed via line 37 through isolation valve 38 and then line 39 to adsorber bed 41 where the water and carbon dioxide are removed by adsorption on, for example, a molecular sieve type 13x. Adsorber bed 41 is one of a pair of vessels (with vessel 42) operated sequentially with a cycle time of 12 to 48 hours.

Purified inert gas product is obtained from the exit of vessel 41 sequentially through line 43, isolation valve 45, line 46 and product line 60.

A portion, from about 5 to 10%, of the product gas is withdrawn from line 46 as regeneration gas via line 47, fed to electric heater 57 wherein it is heated to approximately 230° C., and reduced in pressure across valve 48 to a pressure just sufficient to drive the gas flow through adsorber vessel 42. This low pressure heated gas is fed via line 49, through isolation valve 50 and line 52 to adsorber vessel 42 where the combined effect of heat and reduced pressure is used to desorb carbon dioxide and water from the adsorbent. The regeneration gas is vented via line 53, isolation valve 54 and line 56 to the atmosphere. After a sufficient time has elapsed for the adsorbent to be heated and carbon dioxide and water to be released, the electric heater 57 is switched off and the gas flow continued to cool vessel 42 and the adsorbent in preparation for the subsequent adsorption cycle. The sequence of operation of vessels 41 and 42 is controlled by activation of the isolation valves 38, 40, 44, 45, 50, 51, 54 and 55 and electric heater 57 by an automatic timer.

The regeneration of the oxidizer in vessels 20 and 21 is effected in a similar manner to the absorber but with the addition of oxygen. A portion, approximately 5%, of the hot gas leaving vessel 20 via line 25 is removed via line 26 and reduced in pressure across valve 27 to a sufficient pressure to drive regeneration gas through vessel 21 to vent to atmosphere. A flow of clean dry air is added to the nitrogen flow in a proportion to produce a mixture concentration of approximately 1% oxygen in nitrogen. The mixture, at a temperature of approximately 120° C., is fed via line 29, isolation valve 30 and line 32 to vessel 21 where it is used to reoxidize the partially reduced copper oxide catalyst. After the catalyst has been reoxidized, the air flow is shut off and the vessel is purged with purified nitrogen. The regeneration as is vented from vessel 21 via line 33, isolation valve 34 and line 36 to the atmosphere. The sequence of operation of vessels 20 and 21 for oxidation and regeneration is controlled by activation of the isolation switching valve positions.

In order to demonstrate the efficacy of the present inventions, the process of the present invention was operated using a nitrogen feed with varying impurity contents. These tests were designed to measure the performance of the various stages of the system. All measurements were made at a design flow rate of 20,000 SCFH.

EXAMPLE 1

Performance of Deoxidizer and Oxidizer With Typical Purity Bulk Gas

| Impurity | Feed Composition | Product Composition |
|---|---|---|
| Oxygen: vppm | 0.23 | 0.03* |
| Hydrogen: vppm | 0.49 | <0.05** |
| Carbon Monoxide: vppm | 0.43 | <0.05** |
| Inerts | Balance | Balance |

*Estimated sensitivity of analyzer 0.02 vppm.
**Limiting sensitivity of analytical instrument.

EXAMPLE 2

Performance of Deoxidizer and Oxidizer With a Low Hydrogen/High Carbon Monoxide Impurity Inert Feed

| Impurity | Feed Composition | Product Composition |
|---|---|---|
| Oxygen: vppm | 0.19 | 0.04 |
| Hydrogen: vppm | <0.05** | <0.05** |
| Carbon Monoxide: vppm | 4.28 | <0.05** |
| Inerts | Balance | Balance |

**Limiting sensitivity of analytical instrument.

EXAMPLE 3

Performance of Deoxidizer and Oxidizer with a Temporary High Oxygen/Low Hydrogen Impurity Inert Feed

| Impurity | Feed Composition | Product Composition |
|---|---|---|
| Oxygen: vppm | 4.85 | 0.04 |
| Hydrogen: vppm | <0.05** | <0.05** |
| Carbon Monoxide: vppm | 0.35 | <0.05** |
| Inerts | Balance | Balance |

**Limiting sensitivity of analytical instrument.

These examples demonstrate the effectiveness of the process to operate under the normally expected condition with hydrogen in the feed gas; also at low hydrogen concentrations with carbon monoxide present as the excess reducing gas, and under a temporary condition with an excess of oxygen.

EXAMPLE 4

In a subsequent test after several months operation with bulk feed gas of a normal operating composition (i.e., Example 1) and more extensive and sensitive analytical equipment, a pure product inert gas of the following composition was measured downstream of the adsorber system.

| Impurity | Product Content | Type of Analyzer |
|---|---|---|
| Oxygen: vppb | <10** | Teledyne 356 O$_2$ Analyzer |
| Hydrogen: vppb | <7** | Trace Analytical Reduction Gas Detector |
| Carbon Monoxide: vppb | <2** | Trace Analytical Reduction Gas Detector |
| Carbon Dioxide: vppb | <5** | Hewlett Packard Gas Chromatograph with Flame Ionization Detector |
| Water: vppb | 7 | Endress + Hauser Ondyne Capacitance Cell |
| Inerts | Balance | |

**Limiting sensitivity of analytical instrument.

These results demonstrate the ability of the purifier to achieve ultrapure nitrogen quality to meet the most stringent requirements of the semiconductor industry.

As can be seen, the process solves the problem of economically and safely providing purification of bulk inert gas by using a three stage system of impurity removal in which no hydrogen or other reducing gas is added. In the first stage, the natural excess of hydrogen and carbon monoxide found in bulk nitrogen gas produced by cryogenic air separation is used to react oxygen to water and carbon dioxide and to maintain a reducing atmosphere over a reduced copper catalyst. In the second stage a copper oxide catalyst oxidizer bed is used to convert residual hydrogen and carbon monoxide to water and carbon dioxide. This bed is regenerated using a dilute oxygen stream. The third stage uses an adsorbent (e.g., 13x molecular sieve) to remove the residual water and carbon dioxide at ambient temperature. Regeneration of the absorbent is carried out with a portion of the purified product stream.

The process of the present invention has several features which distinguishes it from prior art, among these are the following:

(1) Hydrogen is not required to be added to the feed or for regeneration of the reactor beds. This eliminates the cost and hazard resulting from the incorporation of hydrogen handling equipment.

(2) The sequence of operation with a first stage deoxidizer and a second stage oxidizer is novel.

(3) The process allows that the feed may contain either hydrogen or carbon monoxide as the reducing impurity with a time average excess over the oxygen impurity. The use of a first stage copper deoxidizer permits a temporary excess of oxygen impurity over reducing gas which is held on the copper catalyst surface as copper oxide.

(4) The use of a second stage oxidizer provides conversion of residual hydrogen and carbon monoxide to readily removable adsorbable impurities.

The process of the present invention has been described above in reference to a specific embodiment thereof. This embodiment should not be viewed as a limitation on the scope of the present invention, however, the scope of the present invention should be ascertained by the following claims.

We claim:

1. A process for the purification of a bulk inert gas stream, wherein the bulk inert gas stream contains oxygen, carbon monoxide and hydrogen impurities and wherein the time-averaged molar concentration of the carbon monoxide plus hydrogen impurities exceeds two times the molar concentration of the oxygen impurity, comprising the sequential steps of:

(a) reacting the oxygen present in the bulk inert gas stream with the carbon monoxide and hydrogen present in the bulk inert gas stream in the presence of a reduced copper containing catalyst at a temperature from 150° to 250° C. to form carbon dioxide and water;

(b) reacting the unreacted carbon monoxide and hydrogen from step (a) with a copper oxide containing catalyst at a temperature from 150° to 250° C. to form carbon dioxide and water and thereby reducing a portion of the copper oxide in the copper oxide containing catalyst to form reduced copper; and (c) removing water and carbon dioxide by adsorbing the water and carbon dioxide onto an adsorbent.

2. The process of claim 1 wherein the adsorbent of step (c) is a molecular sieve adsorbent.

3. The process of claim 1 which further comprises reoxidizing the reduced copper of step (b) by contacting the reduced copper with an oxygen containing stream at temperatures in the range from about 50° to about 150° C.

4. The process of claim 1 which further comprises regenerating the adsorbent of step (c) by contacting the adsorbent with a portion of the purified bulk inert gas stream produced by the process at temperatures in the range from about 150° to about 250° C.

* * * * *